Oct. 10, 1961   A. F. KELSEY, JR   3,003,469
PORTABLE HYDRAULIC ACTUATOR FOR A WELDING GUN
Filed July 18, 1960
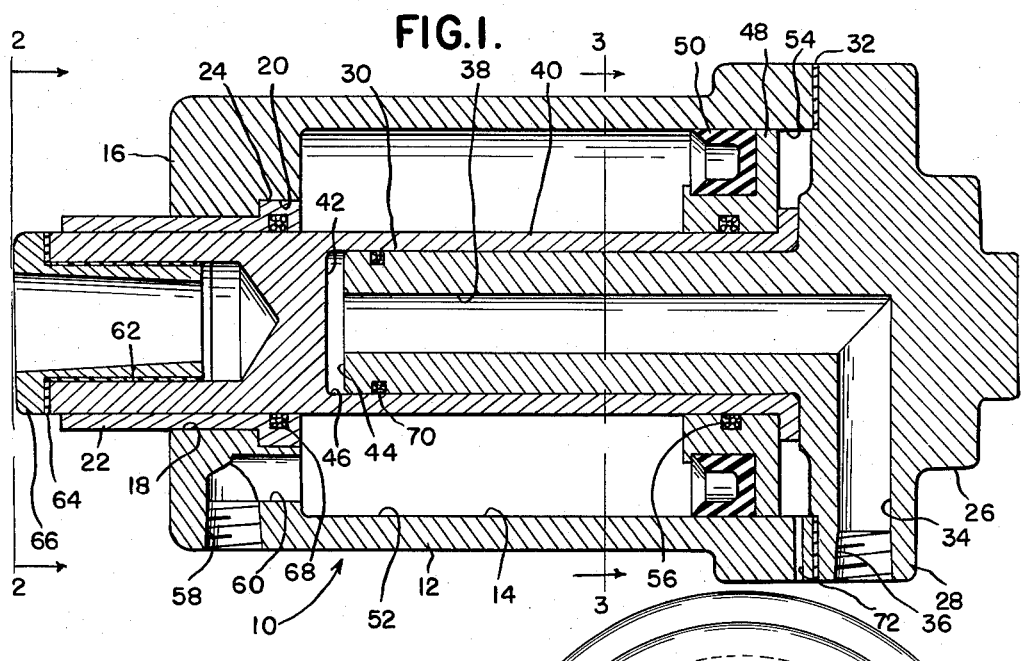
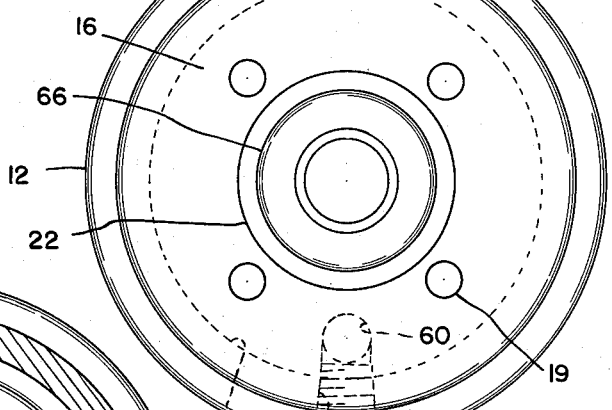
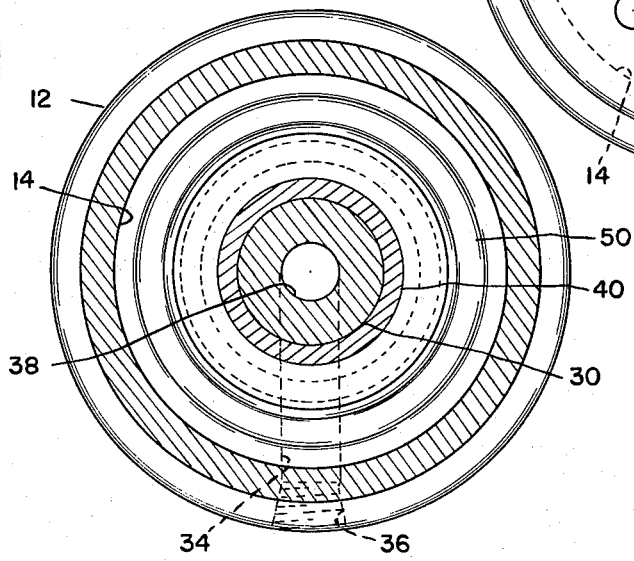
INVENTOR.
ARTHUR F. KELSEY JR.
BY
*Whittemore, Hulbert and Belknap*
ATTORNEYS 3,003,469
PORTABLE HYDRAULIC ACTUATOR FOR A
WELDING GUN
Arthur F. Kelsey, Jr., Dearborn, Mich., assignor to Link Welder Corporation, Detroit, Mich., a corporation of Michigan
Filed July 18, 1960, Ser. No. 43,437
6 Claims. (Cl. 121—38)

This invention relates to a portable actuator. More particularly, this invention relates to a portable hydraulic actuator for a welding gun. Such an invention is characterized by its unique structural arrangement which provides a fast acting actuator, an improved follow-up during the weld cycle and novel positive means for returning the movable member in the actuator to its original position.

Heretofore, portable hydraulic actuators for welding guns included a housing having a piston and rod assembly movable therein. A spring was positioned in the housing concentric with the rod to provide a spring return for the piston after the welding cycle had been completed. Such an arrangement resulted in many serious problems. Not only was spring failure common, but the spring resulted in harmful wear of the cylinder wall and the piston rod. Also, particularly in the use of long stroke cylinders, the length of the return spring or springs required to return the piston and rod assembly for the full length of the stroke required a cylinder which was excessively long and relatively slow acting.

The welding industry has tried to eliminate the spring return cylinder on hydraulic portable guns, but with little success. One design of the cylinder utilized an air return for the piston and rod assembly which was located on the side of the double-acting piston opposite the hydraulic feed. Such an arrangement permitted the air and hydraulic fluid to mix due to leakage across the piston. The mixing of the fluids resulted in failure of the hydraulic booster provided in the system to actuate the piston during the welding cycle.

The present invention has eliminated the problem of the mixing of the actuating and return fluids by providing a third chamber open to atmosphere intermediate the return and hydraulic chambers. In addition, the welding and return areas of the piston and rod assembly may be independently increased or decreased without affecting the other. This permits the welding to be carried out at the required pressures and the piston returned at the desired pressure.

It is an object of the present invention to provide an improved portable hydraulic actuator.

Another object of the present invention is to provide a portable hydraulic actuator which includes an air return for repositioning the piston in the actuator after the completion of the welding cycle.

Still another object of the present invention is to provide a portable hydraulic cylinder having a piston and rod assembly movable therein and which includes an intermediate chamber separating the actuating chamber from the return chamber, thereby preventing the mixing of the fluids in both of said chambers.

A further object of the present invention is to provide a simplified, low-cost structure of the aforementioned type having certain advantages contributing to efficiency, reliability and long life as well as ease of maintenance.

Other objects and features of the invention will become apparent as the description proceeds, especially when taken in conjunction with the accompanying drawing, illustrating a preferred embodiment of the invention, wherein:

FIGURE 1 is a sectional elevational view of the invention.

FIGURE 2 is an end view looking in the direction of line 2—2 of FIGURE 1.

FIGURE 3 is a sectional view taken on line 3—3 of FIGURE 1.

The portable hydraulic actuator is designated by the numeral 10 and includes a cylindrical housing or cylinder barrel 12 made from aluminum bar stock. The barrel 12 has a cavity 14 therein. The cylinder barrel 12 has a wall portion 16 which has a cylindrical opening 18 therein which is in coaxial alignment with the cavity 14. A plurality of holes 19 are provided in the wall portion 16 so that the actuator 10 may be connected to a welding gun. The inner side of the wall portion 16 has a recess 20 formed therein. A cylindrical bushing 22 having an annular flange 24 is received in the opening 18 with the flange 24 positioned in the recess 20 as is shown in FIGURE 1. The bushing 22 may be made from bronze or other suitable material.

A base member 26 made from cast aluminum includes an end cap 28 and a cylindrical guide stem 30. The end cap 28 is positioned against an end wall of the cylinder barrel 12 with the guide stem 30 extending into the cavity 14. A gasket 32 is located between the wall of the cylinder barrel 12 and the end cap portion 28. A plurality of bolts, not shown, secures the base member 26 to the barrel 12. A radial passage 34 is provided in the end cap 28 and extends from a port 36 in the end cap 28 to intersect the axial passage 38 provided in the guide stem 30.

A cylindrical piston rod 40, which may be made from stainless steel, extends through the bushing 22 and is adapted to telescope on the guide stem 30. The piston rod 40 has an intermediate solid portion which defines an annular reaction surface or wall 42. The outer end of the guide stem 30 has an annular reaction surface or wall 44 which is located directly opposite the reaction wall 42. Reaction walls 42 and 44 define part of an expansible fluid chamber or pocket 46 which is utilized in a manner to be subsequently described.

A piston 48 having a U cup-shape sealing element 50 is carried by the inner end of the piston rod 40 and divides the cavity 14 of the cylinder barrel 12 into a pair of chambers 52 and 54. The sealing element 50 and quadring 56 prevent leakage across the piston 48. A port 58 is provided in the cylinder barrel 12 and has a passage 60 communicating with the chamber 52. The outer end of the piston rod 40 has a cylindrical opening 62 which is adapted to receive washer 64 and a tapered welding rod adapter 66. A welding electrode, not shown, is carried by the adapter 66 in a conventional manner. The pilot diameter of the tapered adapter 66 is designed to fit all welding guns.

Quadring 68 is interposed between the piston rod 40 and bushing 22 so as to prevent fluid leakage from the chamber 52. Quadring 70 is placed between the guide stem 30 and the piston rod 40 to prevent leakage from the expansible chamber 46.

From such a description, it is apparent that the expansive chamber 46 and chamber 52 are separated from each other by the intermediate chamber 54 which is vented by passage 72 to atmosphere. If leakage should occur from chambers 46 and 52, it will flow into chamber 54. Thus, chamber 54 provides means for accumulating leakage and serves as a safety device for preventing the mixing of the fluids in chambers 46 and 52.

In operation, the port 36 is connected to a hydraulic source, such as a hydraulic booster, not shown, so as to provide the requisite welding force during the weld cycle. Hydraulic fluid is directed from the booster through passages 34 and 38 to the expansible chamber 46. The hydraulic fluid exerts a force on the wall 42 which is effective over an area which is equal to the difference between the area of walls 42 and 44 so as to move the rod 40 and piston 48 to the left.

When the rod 40 is being displaced during the weld cycle, the chamber 52 is exhausted, thereby permitting the piston and rod assembly to move in its welding stroke unrestricted. Thus, during resistance welding, at the time the metal becomes plastic, the actuator 10 provides a follow-up. No built-up cushion of air is provided to restrict the follow-up of the piston and rod assembly. Such an arrangement does not have a spring or similar means working against the piston 48 at all times and thereby provides a follow-up condition that is considerably improved over the prior art devices.

After the welding cycle has been completed, the chamber 52 is connected through passage 60 and port 58 to a source of air for returning the piston 48 and rod 40 to its original position as shown in FIGURE 1. Value means, not shown, control the flow of air to and from the chamber 52. Such an arrangement provides a positive return since the air pressure acting on the piston 48 is more than sufficient to lift or return the small column of hydraulic fluid in the expansible chamber 46 to the booster. The hydraulic fluid forces the booster to return regardless of whether or not the booster will satisfactorily return itself.

A unique feature of this design is that the areas of the reaction walls 44 and 42 which determine the welding force, and the area of the piston 48 which determines the return force can be independently increased or decreased without affecting the other. This allows the operator to weld at required pressures and return the piston 48 at a desired pressure.

This invention provides many definite advantages during the welding cycle. Due to the elimination of springs, the cylinder is faster acting. Also, the follow-up condition is many times improved. In addition, a positive return has been provided to return the small column of hydraulic fluid to the booster. These advantages have been achieved without sacrificing quality and still providing high or low pressure welding.

It should be understood that various types of material may be utilized without departing from the essence of the invention.

The drawing and the foregoing specification constitute a description of portable hydraulic actuator for a welding gun in such full, clear, concise and exact terms as to enable any person skilled in the art to practice the invention, the scope of which is indicated by the appended claims.

What I claim as my invention is:

1. A portable actuator comprising a housing having a bore therein open at one end and closed at the other, a member secured to said housing and closing the open end of said bore, said member having thereon an elongated stem of a predetermined length extending axially into said bore, a rod extending through the closed end of said bore and having an axially extending socket receiving said stem, opposed spaced portions of said socket and said stem forming an expansible pocket for fluid, a piston sleeved upon and fixed to said rod and movable therewith within said bore relative to said stem, said piston constituting a partition between the closed end of said bore and said member and dividing the space therebetween into a fluid chamber adjacent the closed end of said bore and an accumulator chamber adjacent said member, a supply passage for fluid extending through said member and through said stem, said passage opening into the expansible pocket aforesaid so that fluid discharged from said passage into said expansible pocket will cause said rod to move lengthwise in one direction relative to said stem, and a second supply passage for fluid extending through the closed end of said bore and opening into the fluid chamber aforesaid so that fluid discharged from said second passage into said fluid chamber will cause said rod to move lengthwise in the opposite direction relative to said stem and will cause fluid within said expansible pocket to be discharged into the first mentioned passage aforesaid.

2. A portable actuator comprising a housing having a bore therein open at one end and closed at the other, a member secured to said housing and closing the open end of said bore, said member having thereon an elongated stem of a predetermined length extending axially into said bore, a rod extending through the closed end of said bore and having an axially extending socket receiving said stem, opposed spaced portions of said socket and said stem forming an expansible pocket for fluid, a piston sleeved upon and fixed to said rod and movable therewith within said bore relative to said stem, said piston constituting a partition between the closed end of said bore and said member and dividing the space therebetween into a fluid chamber adjacent the closed end of said bore and an accumulator chamber adjacent said member, a supply passage for fluid extending through said member and through said stem, said passage opening into the expansible pocket aforesaid so that fluid discharged from said passage into said expansible pocket will cause said rod to move lengthwise in one direction relative to said stem, a second supply passage for fluid extending through the closed end of said bore and opening into the fluid chamber aforesaid so that fluid discharged from said second passage into said fluid chamber will cause said rod to move lengthwise in the opposite direction relative to said stem and will cause fluid within said expansible pocket to be discharged into the first mentioned passage aforesaid, and an additional passage in said housing connecting said accumulator chamber to the atmosphere.

3. A portable actuator comprising a housing having a bore therein open at one end and closed at the other, a member secured to said housing and closing the open end of said bore, said member having thereon an elongated stem of a predetermined length extending axially into said bore, a rod extending through the closed end of said bore and having on one end an axially extending socket receiving said stem, opposed spaced portions of said socket and said stem forming an expansible pocket for fluid, a piston sleeved upon and fixed to said rod and movable therewith within said bore relative to said stem, said piston constituting a partition between the closed end of said bore and said member and dividing the space therebetween into a fluid chamber adjacent the closed end of said bore and an accumulator chamber adjacent said member, a supply passage for fluid extending through said member and through said stem, said passage opening into the expansible pocket aforesaid so that fluid discharged from said passage into said expansible pocket will cause said rod to move lengthwise in one direction relative to said stem, a second supply passage for fluid extending through the closed end of said bore and opening into the fluid chamber aforesaid so that fluid discharged from said second passage into said fluid chamber will cause said rod to move lengthwise in the opposite direction relative to said stem and will cause fluid within said expansible pocket to be discharged into the first mentioned passage aforesaid, and an additional passage in said housing connecting said accumulator chamber to the atmosphere, said rod having an axially extending opening on the other end which constitutes an adapter socket.

4. A portable actuator comprising a housing having a bore therein open at one end and closed at the other, a member secured to said housing and closing the open end of said bore, said member having integrally connected thereto an elongated stem of a predetermined length extending axially into said bore, a cylindrical rod extending through the closed end of said bore and having an axially extending cylindrical socket of a length greater than the length of said stem receiving said stem, opposed spaced portions of said socket and said stem forming an expansible pocket for fluid, a piston sleeved upon and fixed to said rod and movable therewith within said bore relative to said stem, said piston constituting a partition between the closed end of said bore and said member and dividing the space therebetween into a fluid chamber adjacent the closed end of said bore and an accumulator chamber adjacent said member, a supply passage for fluid extending through said member and through said stem, said passage opening into the expansible pocket aforesaid so that fluid discharged from said passage into said expansible pocket will cause said rod to move lengthwise in one direction relative to said stem so as to increase the size of said pocket, and a second supply passage for fluid extending through the closed end of said bore and opening into the fluid chamber aforesaid so that fluid discharged from said second passage into said fluid chamber will cause said rod to move lengthwise in the opposite direction relative to said stem to decrease the size of said pocket and will cause fluid within said expansible pocket to be discharged into the first mentioned passage aforesaid.

5. A portable actuator comprising a housing having a bore therein open at one end and closed at the other, a member secured to said housing and closing the open end of said bore, said member having integrally connected thereto an elongated stem of a predetermined length extending axially into said bore, a cylindrical rod extending through the closed end of said bore and having an axially extending cylindrical socket of a length greater than the length of said stem receiving said stem, opposed spaced portions of said socket and said stem forming an expansible pocket for fluid, a piston sleeved upon and fixed to said rod and movable therewith within said bore relative to said stem, said piston constituting a partition between the closed end of said bore and said member and dividing the space therebetween into a fluid chamber adjacent the closed end of said bore and an accumulator chamber adjacent said member, a supply passage for fluid extending through said member and through said stem, said passage opening into the expansible pocket aforesaid so that fluid discharged from said passage into said expansible pocket will cause said rod to move lengthwise in one direction relative to said stem so as to increase the size of said pocket, a second supply passage for fluid extending through the closed end of said bore and opening into the fluid chamber aforesaid so that fluid discharged from said second passage into said fluid chamber will cause said rod to move lengthwise in the opposite direction relative to said stem to decrease the size of said pocket and will cause fluid within said expansible pocket to be discharged into the first mentioned passage aforesaid, and an additional passage in said housing connecting said accumulator chamber to the atmosphere.

6. A portable actuator comprising a housing having a bore therein, an elongated stationary stem in said bore secured on one end to said housing and extending axially of said bore, a movable member having an axially extending socket receiving said stem, opposed spaced portions of said socket and said stem forming an expansible pocket for fluid, a movable wall connected to the outer periphery of said movable member and dividing said bore into a pair of chambers, a first supply passage for fluid extending through said housing and through said stem, said passage opening into said expansible pocket so that fluid discharged from said passage into said expansible pocket will cause said movable member to move lengthwise in one direction relative to said stem, and a second passage in said housing opening into one of said chambers so that fluid discharged from said second passage into said one chamber will cause said member to move lengthwise in the opposite direction relative to said stem and a vent passage in said housing connecting the other chamber to the atmosphere.

References Cited in the file of this patent
UNITED STATES PATENTS

| | | |
|---|---|---|
| 2,283,168 | Ernst et al. | May 19, 1942 |
| 2,629,363 | McClay | Feb. 24, 1953 |